(12) United States Patent
Lasserre et al.

(10) Patent No.: US 7,437,930 B2
(45) Date of Patent: Oct. 21, 2008

(54) ASSEMBLY COMPRISING A DISPENSING DEVICE AND A CASE WHICH MAKES IT POSSIBLE TO KNOW THE DEGREE OF EMPTYING OF THE DISPENSING DEVICE

(75) Inventors: Pierre-Andre Lasserre, Coubron (FR); Marcel Sanchez, Aulnay-Sous-Bois (FR)

(73) Assignee: L'Oreal, Paris (FR)

( * ) Notice: Subject to any disclaimer, the term of this patent is extended or adjusted under 35 U.S.C. 154(b) by 424 days.

(21) Appl. No.: 11/004,797

(22) Filed: Dec. 7, 2004

(65) Prior Publication Data

US 2005/0161472 A1 Jul. 28, 2005

Related U.S. Application Data

(66) Substitute for application No. 60/539,114, filed on Jan. 27, 2004.

(30) Foreign Application Priority Data

Dec. 17, 2003 (FR) .................................. 03 51099

(51) Int. Cl.
*G01F 19/00* (2006.01)
(52) U.S. Cl. ............................. 73/426; 73/427; 73/428; 222/105
(58) Field of Classification Search .................. 73/426; 222/105
See application file for complete search history.

(56) References Cited

U.S. PATENT DOCUMENTS 607,010 A * 7/1898 Baumann .................... 177/207
1,913,761 A * 6/1933 Kokenge ..................... 222/424
1,968,263 A * 7/1934 Reuther ..................... 215/12.1
2,132,015 A * 10/1938 Collins ......................... 73/450
3,241,722 A * 3/1966 Nissen ........................ 222/136
3,438,481 A * 4/1969 Durand ....................... 206/429
3,710,984 A * 1/1973 Webster ................... 222/145.8
D249,919 S * 10/1978 Thrush ........................ D7/530
D260,839 S * 9/1981 Durand ........................ D7/530
D282,134 S * 1/1986 Durand ........................ D7/523
D283,387 S * 4/1986 Durand ........................ D7/523
4,876,891 A * 10/1989 Felt et al. ...................... 73/426
5,044,509 A * 9/1991 Petrosky et al. ............. 215/366
5,071,060 A * 12/1991 DeFelice .................... 229/403
5,125,466 A * 6/1992 Felt et al. .................... 177/207

(Continued)

FOREIGN PATENT DOCUMENTS

FR 2 653 877 5/1991

(Continued)

*Primary Examiner*—Hezron E. Williams
*Assistant Examiner*—Samir M. Shah
(74) *Attorney, Agent, or Firm*—Oliff & Berridge, PLC

(57) ABSTRACT

The present invention relates to an assembly comprising:
a dispensing device containing at least one product to be dispensed, and
a case for holding the dispensing device when the latter is not in use, this case comprising a housing in which the dispensing device is held, this housing having a lower part and an upper part widened relative to the lower part, the case being configured to receive a quantity of liquid which is sufficient for the dispensing device to be able to float in the case at least when the dispensing device is not completely full.

27 Claims, 3 Drawing Sheets

U.S. PATENT DOCUMENTS

| | | | | |
|---|---|---|---|---|
| 5,406,995 | A | * | 4/1995 | Gantzer ........................ 141/325 |
| 6,062,430 | A | * | 5/2000 | Fuchs ........................... 222/105 |
| 6,073,804 | A | * | 6/2000 | Yquel ............................ 222/95 |
| 6,250,154 | B1 | * | 6/2001 | Cheresko ....................... 73/426 |
| 6,427,879 | B1 | * | 8/2002 | Caldwell .................... 222/465.1 |
| 7,086,567 | B1 | * | 8/2006 | Ciavarella et al. .............. 222/95 |
| 2004/0159673 | A1 | * | 8/2004 | Hennessey et al. ........... 222/105 |
| 2006/0156811 | A1 | * | 7/2006 | Borowski et al. .............. 73/426 |

FOREIGN PATENT DOCUMENTS

| | | |
|---|---|---|
| GB | 2 348 677 A | 10/2000 |

\* cited by examiner

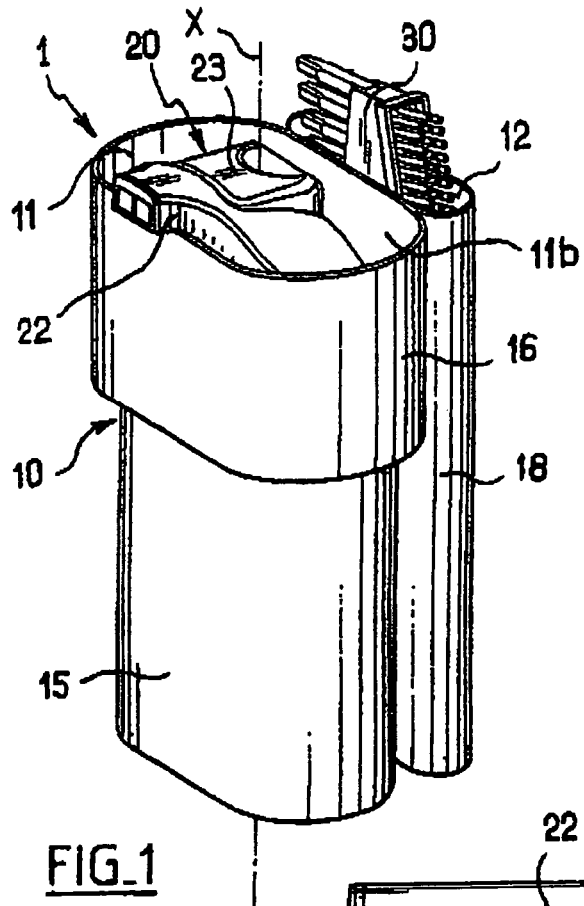
FIG_1
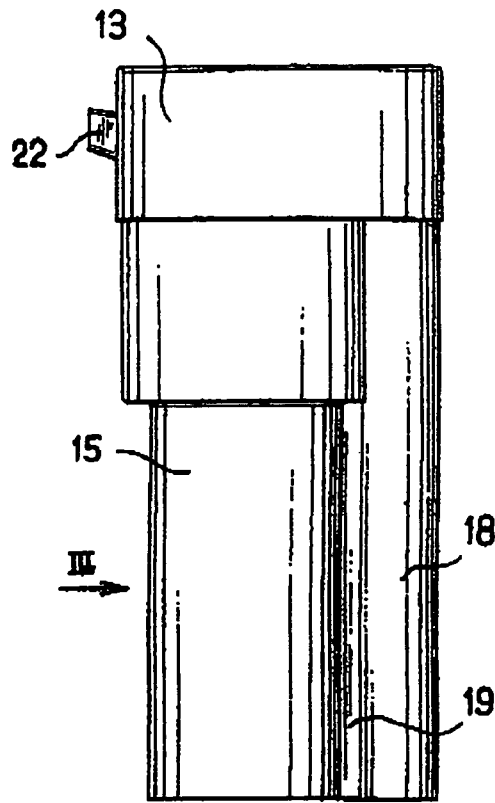
FIG_2
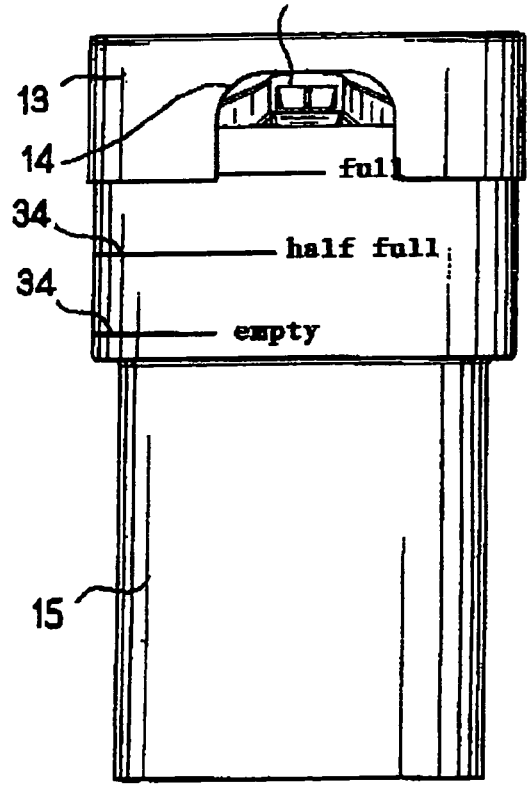
FIG_3

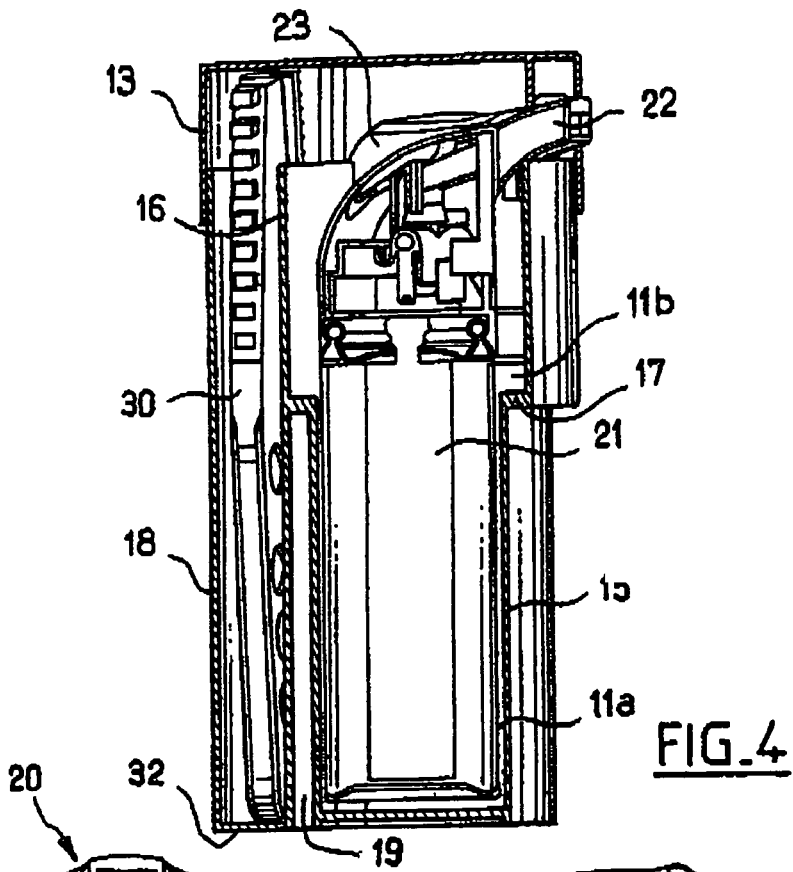
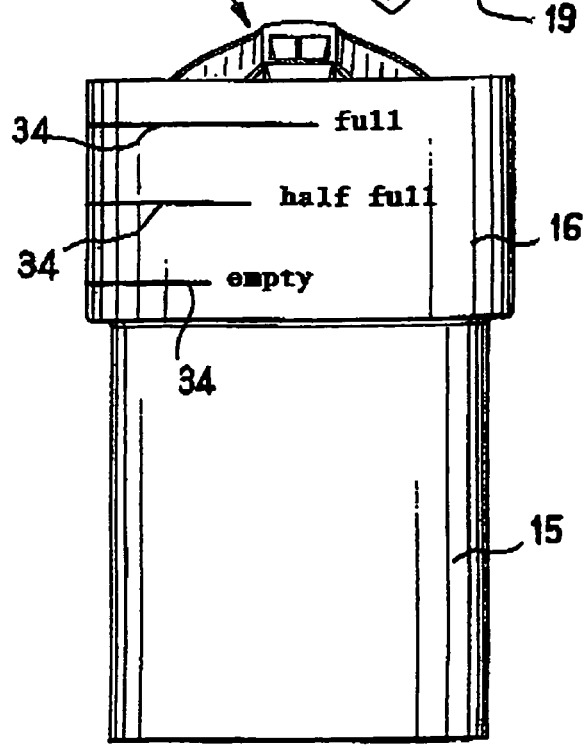
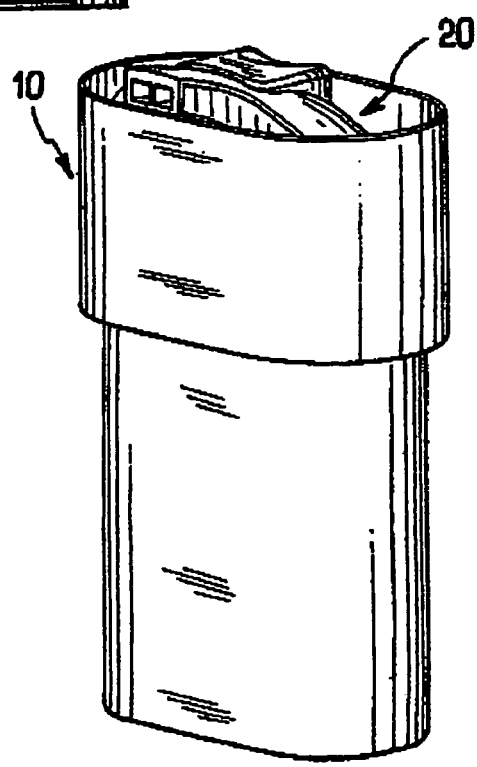
FIG.4
FIG.5
FIG.6

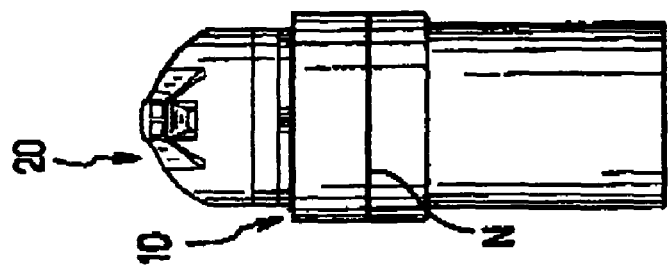
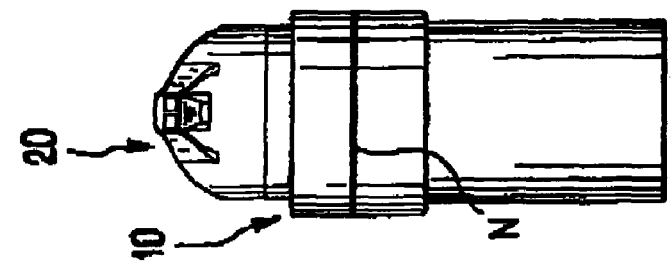
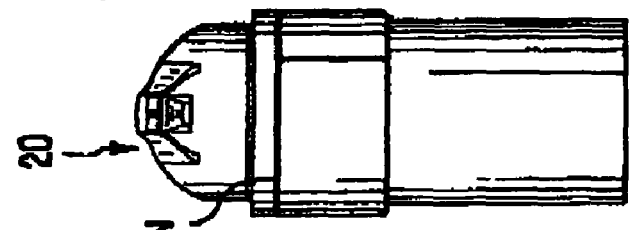
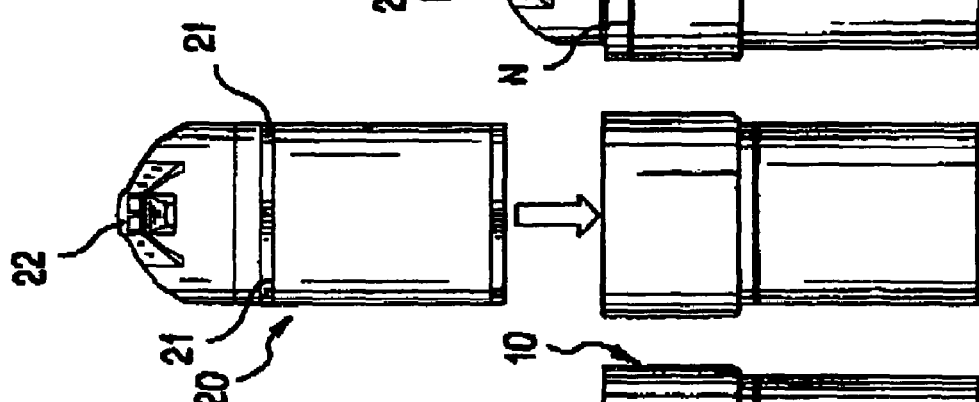
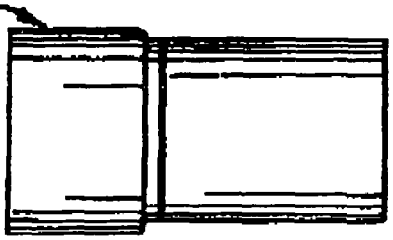
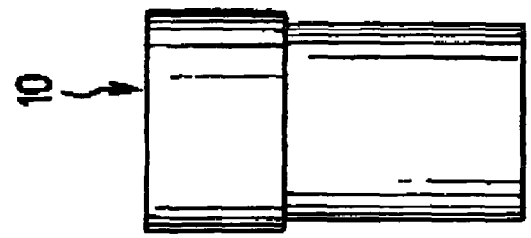

ASSEMBLY COMPRISING A DISPENSING DEVICE AND A CASE WHICH MAKES IT POSSIBLE TO KNOW THE DEGREE OF EMPTYING OF THE DISPENSING DEVICE

This nonprovisional application claims the benefit of U.S. Provisional Application No. 60/539,114, filed Jan. 27, 2004.

The present invention relates particularly to the use of dispensing devices comprising at least one opaque container containing the product to be dispensed.

A difficulty connected with using such containers lies in the fact that it is difficult for the user to know precisely the degree of emptying of the container.

However, it is desirable in certain areas, particularly that of hair colouring, to be sure that the necessary amount of product for the treatment envisaged is available before proceeding therewith.

In fact, the act of changing the dispensing device in the course of treatment and the manipulations entailed thereby if the hairdresser is not prepared may be a source of discomfort for the customer and impair the quality of the finished result.

French Patent Application FR 2 653 877 describes a device in which a container, the degree of filling of which is liable to vary, is arranged in a case which is filled with water and the bottom of which comprises an elastic system, the container being subjected both to the Archimedes Principle due to the water present in the case and to the action of the elastic system. Such a device is relatively complex and costly to produce. In addition, the container is not configured to be easily removed from the case in which it is held.

The present invention aims to offer a solution to the problem of determining the degree of emptying of a dispensing device, this solution being reliable, relatively inexpensive and easy to implement, particularly in hairdressing salons.

According to a first of its aspects among others, the subject of the invention is thus an assembly comprising on the one hand a dispensing device containing at least one product to be dispensed and on the other hand a case for holding the dispensing device when the latter is not in use. The case comprises a housing in which the dispensing device is held. This housing has a lower part and an upper part widened relative to the lower part, the case being configured to receive a quantity of liquid which is sufficient for the dispensing device to be able to float in the case at least when the dispensing device is not completely full.

The ratio $$\frac{\text{cross section of the upper part of the housing}}{\text{cross section of the lower part of the housing}}$$

is, for example, greater than 1.1, better still 1.2.

By virtue of the invention, the user of the dispensing device benefits from a relatively simple means for determining the degree of emptying of the latter.

The upper part, widened relative to the lower part, minimizes the risks of overflow.

In a specific embodiment, the case may be configured to make it possible to read the level of the liquid in the latter when the case is filled with liquid. The case may especially comprise a non-opaque part making it possible to read the liquid level in the case.

In a specific embodiment, the ratio $$\frac{\text{cross section of the upper part of the housing}}{\text{cross section of the lower part of the housing}}$$

is greater than 1.1, better still 1.2.

In a specific embodiment, the case is made as a single piece by moulding plastic, particularly in a transparent plastic.

Preferably, the lower part has a cross section corresponding approximately to that of the dispensing device.

Thus, when introduced into the corresponding housing of the case, the dispensing device can displace a relatively substantial height of liquid, making it possible to benefit from a greater accuracy in the reading.

The ratio $$\frac{\text{cross section of the housing}}{\text{cross section of the dispensing device}}$$

measured for example approximately at a quarter of the height of the housing from the bottom of the housing or approximately halfway up the housing, may not exceed 1.5, better still 1.2, or even 1.1.

In an exemplary embodiment of the invention, the lower and upper parts of the housing holding the dispensing device are each approximately cylindrical, with parallel generatrices. The directrices may be non-circular, these directrices being, for example, approximately homothetic and each delimiting an oblong shape.

The assembly may comprise a lid designed to be fitted onto the case.

This lid may be provided with an opening enabling a nozzle of the dispensing device to pass through.

The case may comprise, apart from the first housing intended to hold the dispensing device, a second housing for holding an accessory, for example a comb intended to spread the product delivered by the dispensing device over the hair. If appropriate, this comb may be used to isolate at least one lock of hair.

The second housing may be defined by a column whose foot is separated from the wall of the case defining the first housing.

The space formed between the foot of the column and the rest of the case may facilitate possible attachment of the latter to a support, during use.

The case advantageously comprises at least two markers corresponding to two degrees of emptying of the dispensing device.

Unlike the device described in French Patent Application FR 2 653 877, the dispensing device is able not to be subjected to the action of an elastic system, which reduces the cost.

The dispensing device comprises, for example, at least one container, particularly a pressurized container, for example at least two pressurized containers containing products to be mixed as and when required, for example a dye and an oxidizing agent.

The lower part of the housing holding the dispensing device may extend over a major part of the height of the container or containers of the dispensing device, for example over more than three quarters of the height of the container or containers.

The height of the case may correspond approximately to the height of the dispensing device, extending just below the dispensing nozzle of the latter. Thus, when the lid is fitted onto the case, the dispensing nozzle can be retained between an upper edge of the case and the edge of the opening in the lid accommodating the dispensing nozzle.

According to another of its aspects, an additional subject of the invention, independently of or in combination with the foregoing, is an assembly comprising on the one hand a dispensing device containing at least one product to be dispensed and on the other hand a case for holding the dispensing device when the latter is not in use, this case comprising at least one non-opaque part making it possible to read the level of the liquid in the case when the latter is filled with a liquid. The case comprises a housing in which the dispensing device is held. This housing has a lower part having a cross section corresponding approximately to that of the portion of the dispensing device which is engaged in the interior.

According to another of its aspects, an additional subject of the invention, independently of or in combination with the foregoing, is an assembly comprising on the one hand a dispensing device containing at least one product to be dispensed and on the other hand a case for holding the dispensing device when the latter is not in use. This case may comprise a non-opaque part making it possible to read the level of the liquid in the case when the latter is filled with a liquid. The case is also configured to receive a quantity of liquid which is sufficient for the dispensing device to be able to float in the case at least when the dispensing device is empty. The dispensing device and the case may be configured such that the dispensing device is subjected, in the case, solely to the Archimedes Principle due to the liquid contained in the latter.

According to another of its aspects, an additional subject of the invention, independently of or in combination with the foregoing, is an assembly comprising on the one hand a dispensing device containing at least one product to be dispensed and on the other hand a case for holding the dispensing device when the latter is not in use, this case being able to comprise at least one non-opaque part making it possible to read the level of the liquid in the case when the latter is filled with a liquid. The case comprises a housing in which the dispensing device is held and a second housing able to accommodate an accessory, particularly a comb. This second housing may be defined by a column whose foot is separated from the rest of the case.

A better understanding of the invention may be gained on reading the detailed description below of exemplary embodiments which do not restrict the invention and on examining the attached drawing, in which:

FIG. 1 is a perspective schematic view of an assembly produced according to the invention, with the lid removed, FIG. 2 is a side view of the assembly of FIG. 1, with the lid fitted, FIG. 3 is a front view along the arrow III of FIG. 2, FIG. 4 is a schematic longitudinal section of the assembly of FIGS. 2 and 3, FIG. 5 is a view similar to FIG. 3, after removal of the cover, FIG. 6 represents a variant embodiment of the case, and FIGS. 7 to 12 illustrate the use of the case.

FIG. 1 depicts an assembly 1 comprising a case 10 having a shape elongated along a longitudinal axis X and defining a housing 11 in which a container, in this instance a dispensing device 20, is held.

The latter may comprise, for example, two pressurized containers 21, only one of which is visible in FIG. 4, and also a mechanism comprising a dispensing nozzle 22 and a push-button 23 for acting on the valves of the containers 21.

In the example in question, the case 10 comprises, apart from the first housing 11, a second housing 12 in which can be arranged an accessory 30 such as a comb, for example.

The housings 11 and 12 may be closed by a cover 13 as can be seen particularly in FIGS. 2 and 3, this cover 13 comprising, in the example illustrated, an opening 14 enabling the dispensing nozzle 22 to protrude.

The housing 11 which holds the dispensing device 20 comprises in its lower region a first part 11a which is defined by a wall 15, the cross section of this first part corresponding approximately to that of the dispensing device 20.

The housing 11 comprises in its upper region a second, widened part 11b which is defined by a wall 16. The first and second parts are connected by a shoulder 17 which is closer to the upper end of the containers 21 of the dispensing device 20 than to their lower end.

In the example in question, the first part 11a defined by the wall 15 extends approximately over slightly more than three quarters of the height of the containers 21 of the dispensing device 20.

The cross section of the housing 11 is oblong, each of the walls 15 and 16 in the example in question being approximately cylindrical, with generatrices parallel to the axis X and with approximately homothetic and non-circular directrices, each directrix being formed, for example, by two semicircles joined by parallel straight lines.

The second housing 12 is defined by a column 18 whose cross section is oblong.

The column 18 is connected only to the aforementioned wall 16 such that its foot forms a space 19 with the wall 15.

The lower end 32 of the foot of the column 18 is coplanar with the lower end of the wall 15, making it possible to improve the stability of the assembly when it is resting on a flat horizontal surface.

The case 10 may be made in a transparent plastic so as to allow the user to visually observe the level of a liquid introduced into the inside, for example water.

In a variant which has not been illustrated, the case 10 is covered in places by a coating, for example a paint or a plastic film, so as to form an observation window to observe the level of the liquid in the case 10.

As in the example illustrated, the outer face of the wall 16 may be inscribed with markers 34 taking the form of horizontal lines, for example.

Depending on the degree to which the dispensing device 20 has been emptied, the latter displaces a greater or lesser quantity of liquid within the case and the level of the liquid is thus representative of the amount of product still available in the dispensing device 20.

FIG. 6 depicts a variant embodiment of the case 10 in which the latter is not provided with a column 18.

An example showing the use of the assembly 1 will now be described with reference to FIGS. 7 to 12.

First of all, the case 10 is filled with water until a predefined level has been reached, this level corresponding for example to the shoulder 17, as illustrated in FIGS. 8 and 9. When the dispensing device 20, as yet unused, is introduced into the case 10, as illustrated in FIGS. 9 and 10, the level N of the liquid coincides approximately with the upper marker 34.

Next, as the dispensing device 20 progressively empties, the level N falls, as illustrated in FIGS. 11 and 12.

Each time the user replaces the dispensing device 20 in the case 10 between two uses, he is thus able to know, depending on the height of the level N, the amount of product still available in the dispensing device 20.

Of course, the invention is not restricted to the examples which have just been described.

In particular, the shape of the case may be modified to adapt it to a dispensing device 20 which might have been produced in some other way, which might for example comprise only one pressurized container or a pump or any other means of extracting the product contained inside.

Throughout the description, including the claims, the expression "comprising a" is to be understood as being synonymous with "comprising at least one", unless otherwise specified.

The invention claimed is:

1. An assembly comprising:
a dispensing device comprising a dispensing nozzle and a push-button and containing at least one product to be dispensed, and
a case for holding the dispensing device when the dispensing device is not in use, said case comprising a housing in which the dispensing device is held, said housing having a lower part and an upper part widened relative to the lower part, the case being configured to receive a quantity of a liquid which is sufficient for the dispensing device to be able to float in the case at least when the dispensing device is not completely full, and
wherein the ratio $$\frac{\text{cross section of the housing}}{\text{cross section of the dispensing device}}$$

measured at approximately a quarter of the height of the housing from the bottom of the housing or approximately halfway up the housing, does not exceed 1.5.

2. The assembly according to claim 1, wherein the case is configured to make it possible to read the level of the liquid in the case when the case is filled with liquid.

3. The assembly according to claim 2, wherein the case comprises a non-opaque part making it possible to read the liquid level in the case.

4. The assembly according to claim 1, wherein the ratio $$\frac{\text{cross section of the upper part of the housing}}{\text{cross section of the lower part of the housing}}$$

is greater than 1.1.

5. The assembly according to claim 4, wherein the ratio is greater than 1.2.

6. The assembly according to claim 1, wherein the case is made as a single piece by moulding plastic.

7. The assembly according to claim 6, wherein the plastic is a transparent plastic.

8. The assembly according to claim 1, wherein the lower part has a cross section corresponding approximately to that of the dispensing device.

9. The assembly according to claim 1 wherein the ratio does not exceed 1.2.

10. The assembly according to claim 1 wherein the ratio does not exceed 1.1.

11. The assembly according to claim 1, wherein it comprises a lid configured to be fitted onto the case.

12. The assembly according to claim 11, wherein the lid is provided with an opening enabling a nozzle of the dispensing device to pass through.

13. The assembly according to claim 1, wherein the case comprises, apart from the housing for holding the dispensing device, a second housing for holding an accessory.

14. The assembly according to claim 13, wherein the accessory is a comb.

15. The assembly according to claim 13, wherein the second housing is defined by a column having a foot separated from the rest of the case.

16. The assembly according to claim 1, wherein the case comprises at least two markers corresponding to two degrees of emptying of the dispensing device.

17. The assembly according to claim 1, wherein the dispensing device comprises at least one container.

18. The assembly according to claim 17, wherein the container is a pressurized container.

19. The assembly according to claim 17, wherein the dispensing device comprises at least two pressurized containers containing products to be mixed as and when required.

20. The assembly according to claim 19, wherein the lower part extends over a major part of the height of the container.

21. The assembly according to claim 20, wherein the lower part extends over more than three quarters of the height of the container.

22. The assembly according to claim 17, wherein the lower part extends over a major part of the height of the container.

23. The assembly according to claim 22, wherein the lower part extends over more than three quarters of the height of the container.

24. The assembly according to claim 1, wherein the height of the case corresponds approximately to the height of the dispensing device, measured from its lower end to just below the dispensing nozzle.

25. The assembly according to claim 1, wherein the dispensing device is subjected, in the case, solely to the Archimedes Principle due to the liquid contained in the case.

26. An assembly comprising:
a dispensing device comprising a dispensing nozzle and a push-button and containing at least one product to be dispensed, and
a case for holding the dispensing device when the dispensing device is not in use, said case comprising a housing in which the dispensing device is held, said housing having a lower part and an upper part widened relative to the lower part, the case being configured to receive a quantity of a liquid which is sufficient for the dispensing device to be able to float in the case at least when the dispensing device is not completely full, and
wherein the case comprises, apart from the housing for holding the dispensing device, a second housing for holding an accessory, and
wherein the accessory is a comb.

27. An assembly comprising:
a dispensing device comprising a dispensing nozzle and a push-button and containing at least one product to be dispensed, and
a case for holding the dispensing device when the dispensing device is not in use, said case comprising a housing in which the dispensing device is held, said housing having a lower part and an upper part widened relative to the lower part, the case being configured to receive a quantity of a liquid which is sufficient for the dispensing device to be able to float in the case at least when the dispensing device is not completely full,
wherein the case comprises, apart from the housing for holding the dispensing device, a second housing for holding an accessory, and
wherein the second housing is defined by a column having a foot separated from the rest of the case.

* * * * *